United States Patent
Roberts et al.

(10) Patent No.: US 10,030,534 B2
(45) Date of Patent: Jul. 24, 2018

(54) DETECTABLE DATUM MARKERS FOR GAS TURBINE ENGINE COMPONENTS FOR MEASURING DISTORTION

(71) Applicant: General Electric Company, Schenectady, NY (US)

(72) Inventors: Herbert Chidsey Roberts, Middletown, OH (US); Glenn Curtis Taxacher, Simpsonville, SC (US)

(73) Assignee: General Electric Company, schenectady, NY (US)

( * ) Notice: Subject to any disclaimer, the term of this patent is extended or adjusted under 35 U.S.C. 154(b) by 0 days.

(21) Appl. No.: 15/051,803

(22) Filed: Feb. 24, 2016

(65) Prior Publication Data

US 2017/0241286 A1 Aug. 24, 2017

(51) Int. Cl.
| | |
|---|---|
| G06K 19/06 | (2006.01) |
| F01D 21/00 | (2006.01) |
| F01D 17/02 | (2006.01) |
| G01M 15/02 | (2006.01) |
| G01B 11/16 | (2006.01) |
| G01B 11/24 | (2006.01) |

(52) U.S. Cl.
CPC ........... *F01D 21/003* (2013.01); *F01D 17/02* (2013.01); *G01B 11/16* (2013.01); *G01B 11/24* (2013.01); *G01M 15/02* (2013.01)

(58) Field of Classification Search
CPC ......... G06K 19/0779; G06K 19/07758; G06K 19/07762
USPC ............................... 235/492, 462.46, 472.02
See application file for complete search history.

(56) References Cited

U.S. PATENT DOCUMENTS

| | | |
|---|---|---|
| 3,934,144 A | 1/1976 | Green et al. |
| 5,331,855 A | 7/1994 | Takashita et al. |
| 6,343,251 B1 | 1/2002 | Herron et al. |
| 6,739,512 B2 | 5/2004 | Guerrero et al. |
| 6,820,023 B1 | 11/2004 | Klassen et al. |
| 7,296,615 B2 | 11/2007 | Devine, II et al. |
| 8,108,168 B2 | 1/2012 | Sharp et al. |
| 8,336,596 B2 | 12/2012 | Nelson et al. |
| 8,352,117 B2 | 1/2013 | Martin |
| 8,641,847 B2 | 2/2014 | Nelson et al. |

(Continued)

FOREIGN PATENT DOCUMENTS

| | | |
|---|---|---|
| DE | 102011011392 A1 | 8/2012 |
| DE | 102014213919 A1 | 1/2016 |
| JP | 5578205 A | 6/1980 |

OTHER PUBLICATIONS

Extended European Search Report and Opinion issued in connection with corresponding EP Application No. 17156242.4 dated Jun. 28, 2017.

*Primary Examiner* — Daniel St Cyr
(74) *Attorney, Agent, or Firm* — General Electric Company; Pamela Kachur

(57) ABSTRACT

The present disclosure is directed to a system and method for detecting distortion in a component of a gas turbine engine. In one embodiment, the system includes at least one detectable datum marker configured at least partially within the component. Further, the system includes a non-destructive inspection tool configured to monitor a location of the detectable datum marker over time. Thus, distortion of the component can be detected as a function of movement of the location of the detectable datum.

20 Claims, 3 Drawing Sheets

(56) References Cited

U.S. PATENT DOCUMENTS

| | | |
|---|---|---|
| 9,016,560 B2 | 4/2015 | Kotian et al. |
| 2003/0094493 A1* | 5/2003 | Guerrero ................. H04L 41/12 235/462.01 |
| 2006/0251507 A1* | 11/2006 | Braswell ................. F01D 5/027 415/13 |
| 2007/0085904 A1 | 4/2007 | Heyworth |
| 2008/0306714 A1 | 12/2008 | Ferrarese et al. |
| 2010/0014102 A1 | 1/2010 | Blair |
| 2011/0103933 A1 | 5/2011 | Olesen et al. |
| 2012/0002038 A1 | 1/2012 | Furrer et al. |
| 2012/0044092 A1* | 2/2012 | Shore ..................... B64F 5/00 340/945 |
| 2013/0202192 A1 | 8/2013 | Telfer et al. |
| 2014/0000380 A1 | 1/2014 | Slowik et al. |
| 2014/0208163 A1* | 7/2014 | Domke .................. G05B 23/00 714/37 |
| 2015/0051868 A1 | 2/2015 | Cloninger, II et al. |
| 2015/0156462 A1 | 6/2015 | Vichniakov et al. |

\* cited by examiner

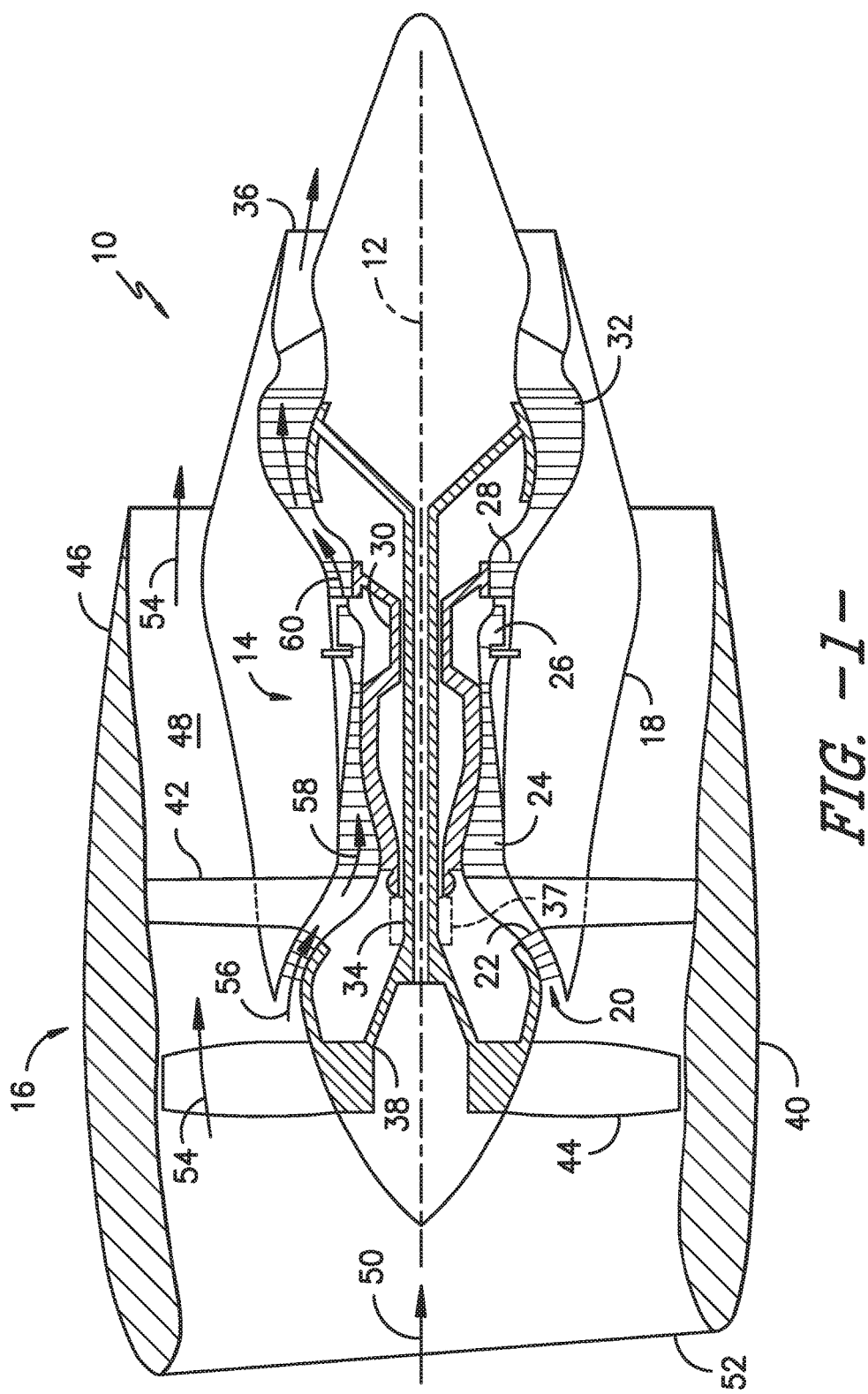
FIG. -1-

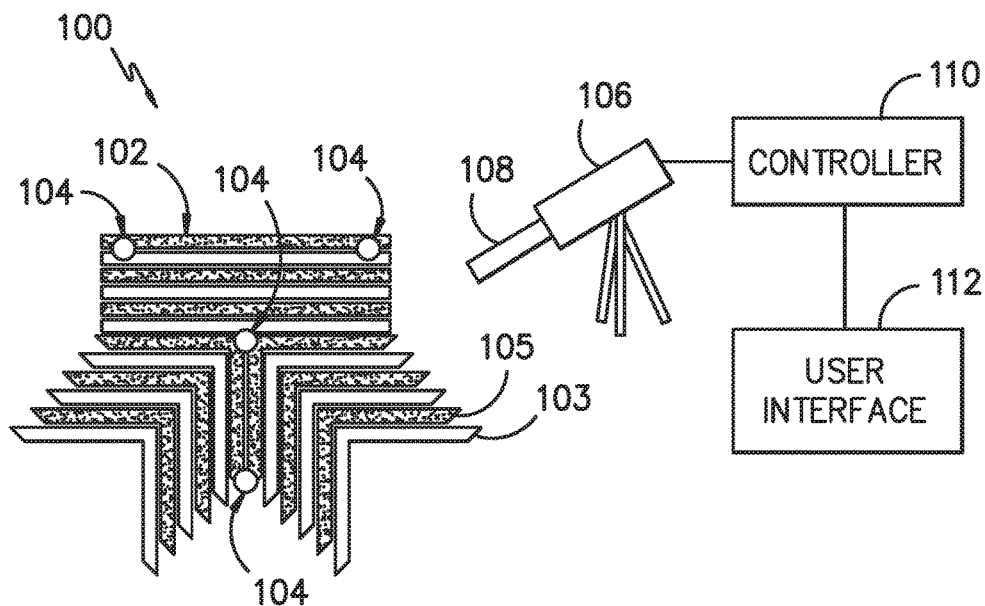
FIG. -2-
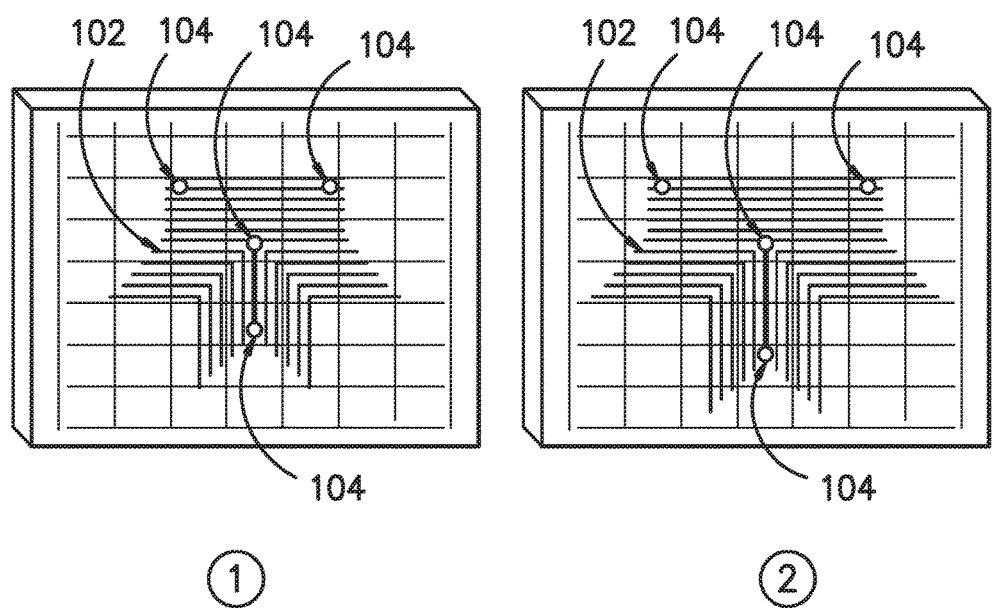
FIG. -3-

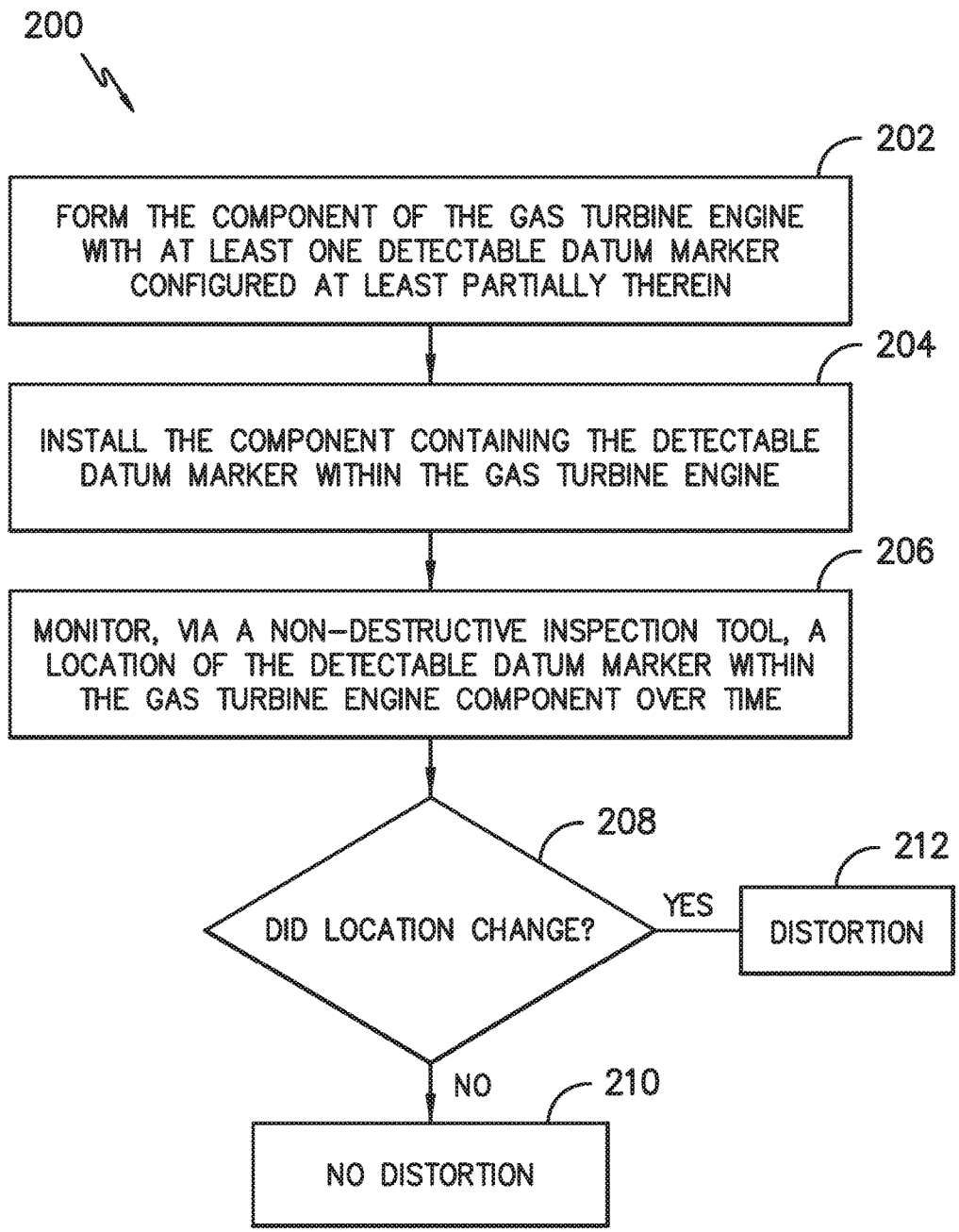
FIG. -4-

DETECTABLE DATUM MARKERS FOR GAS TURBINE ENGINE COMPONENTS FOR MEASURING DISTORTION

FIELD OF THE INVENTION

The present invention relates generally to gas turbine engines, and more specifically, to internal detectable datum markers or reference points for gas turbine engine components for measuring distortion in said components.

BACKGROUND OF THE INVENTION

A gas turbine engine generally includes, in serial flow order, a compressor section, a combustion section, a turbine section and an exhaust section. In operation, air enters an inlet of the compressor section where one or more axial or centrifugal compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as a rotor shaft, rotor disks mounted or otherwise carried by the rotor shaft, turbine blades mounted to and radially extending from the periphery of the disks, and various stationary turbine components such as stator vanes or nozzles, turbine shrouds, and engine frames. The rotatable and stationary turbine components at least partially define the hot gas path through the turbine section. For example, the gas turbine buckets or blades generally have an airfoil shape designed to convert the thermal and kinetic energy of the flow path gases into mechanical rotation of the rotor. As the combustion gases flow through the hot gas path, thermal energy is transferred from the combustion gases to the rotatable and stationary turbine components. Such gas turbine engines are commonly employed on an aircraft.

During operation, various gas turbine engine components are subjected to operational loads and/or environmental conditions that can lead to dimension distortions of the parts. Though some distortion is acceptable, distortion above a certain threshold may require component repair or replacement. As such, it is important to inspect such components for distortion throughout operation of the gas turbine engine. Conventional methods of component inspection require removal of the part from the gas turbine engine for further inspection, e.g. using a coordinate measuring machine (CMM) or a white light inspection system. Such methods, however, are time-consuming and expensive as they require engine downtime and reduce time on-wing.

In view of the aforementioned, an improved system and method for inspecting gas turbine engine components that does not require removal of the components would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a system for detecting distortion in a component of a gas turbine engine. The system includes at least one detectable datum marker configured at least partially within the component. Further, the system includes a non-destructive inspection tool configured to monitor a location of the detectable datum marker over time. Thus, distortion of the component can be detected as a function of movement of the location of the detectable datum.

In another aspect, the present disclosure is directed to a method for detecting distortion in a component of a gas turbine engine. The method includes forming the component of the gas turbine engine with at least one detectable datum marker configured at least partially therein. Another step includes installing the component containing the detectable datum marker within the gas turbine engine. The method also includes monitoring, via a non-destructive inspection tool, a location of the detectable datum marker within the gas turbine engine component over time. Thus, distortion of the component can be detected as a function of movement of the location of the detectable datum.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 1 illustrates a cross-sectional view of one embodiment of a gas turbine engine that may be utilized within an aircraft according to the present disclosure;

FIG. 2 illustrates a schematic diagram of one embodiment of a system for detecting distortion in a component of a gas turbine engine according to the present disclosure;

FIG. 3 illustrates a plurality of images generated by a non-destructive inspection tool of a system for detecting distortion in a component of a gas turbine engine according to the present disclosure; and FIG. 4 illustrates a flow diagram of one embodiment of a method for detecting distortion in a component of a gas turbine engine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to a system and method for detecting distortion in a component of a gas turbine engine. In one embodiment, the system includes at least one detectable datum marker configured at least partially within the component. Further, the system includes a non-destructive inspection tool configured to monitor a location of the detectable datum marker over time. Thus, distortion of the component can be detected as a function of movement of the location of the detectable datum.

The present disclosure provides many advantages not present in the prior art. More specifically, by using detectable reference materials in the gas turbine engine components, the non-destructive inspection tool of the system can detect component distortion while the part remains installed in the gas turbine engine or actively in service. Thus, the lack of disassembly and capability to inspect the part in situ lowers the inspection cost and permits real-time fault detection.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Referring now to FIG. 2, a schematic diagram of one embodiment of a system 100 for detecting distortion in a component 102 of the gas turbine engine 10 is illustrated. As used herein, a distortion generally refers to an alteration in the component 102 that is indicative of damage that has occurred or may occur therein. Thus, the term distortion generally encompass non-material alterations as well as more serious alterations such as creep, bending, curving, and/or deformation. Further, in certain embodiments, as mentioned, the gas turbine engine 10 may include an aircraft engine. Thus, in such embodiments, the aircraft engine may be installed on an aircraft during the detection/inspection procedure described herein. As such, the system 100 of the present disclosure is configured to detect distortion of the component 102 while the aircraft engine remains installed on an aircraft. Further, the component 102 of the gas turbine engine 10 may include any engine component, including but not limited to a turbine blade, a turbine vane, a compressor blade, a compressor vane, a fan blade, a nozzle, a disc, a shaft, or any other suitable engine component.

More specifically, the component 102 of the gas turbine engine 10 may be a process-formed component constructed, at least in part, of a first material such as a metal, metal alloy, or polymer matrix composite. Further, in certain embodiments, the process-formed component(s) 102 may be formed via composite laminate layup, infusion, molding, casting, or any other suitable process. For example, as shown in FIG. 2, the illustrated component 102 is composite layered component.

Thus, as shown, the system 100 also includes at least one detectable datum marker 104 configured at least partially within the component 102 of the gas turbine engine 10. More specifically, in the illustrated embodiment, during layup of the layers 103, 105, the detectable datum markers 104 can be easily placed between or adjacent to one or more of the layers 103, 105 such that the final component 102 has the markers 104 embedded completely or partially therein.

In further embodiments, the detectable datum marker 104 may be placed in the mold of the component 102 during manufacturing thereof such that the marker 104 is integral with the component 102 when installed in the gas turbine engine 10. Further, as shown, the system 100 may include a plurality of detectable datum markers 104 located in a plurality of predetermined locations. For example, in the illustrated embodiment, four detectable datum markers 104 are provided in the component 102 although it should be understood that more than four or less than four detectable datum markers 104 may be included at any location within or on the component 102.

It should be understood that the detectable datum marker(s) 104 may be constructed of any suitable second material e.g. that is different than the first material of the component 102 of the gas turbine engine 10. Thus, the first material of the component 102 and the second material of the detectable datum marker(s) 104 may have varying or different densities. As such, the detectable datum marker(s) 104 can be easily viewed by a non-destructive inspection tool 106, which will be described in more detail below. More specifically, in certain embodiments, the second material of the detectable datum marker(s) 104 may a metal, a metal alloy, a radio-frequency identification (RFID) chip, a polymer plastic, or similar. Further, the metal or metal alloy may include tin, aluminum, nickel, lead, stainless steel, copper, or phosphor-bronze.

In addition, the system 100 also includes a non-destructive inspection tool 106 configured to monitor a location of the detectable datum marker 104 over time. Thus, distortion of the component 102 can be detected as a function of movement of the location of the detectable datum 104. It should be understood that the non-destructive inspection tool 106 may include any suitable non-destructive inspection tool and/or method including but not limited to X-ray, ultrasonic, magnetic-based, liquid penetrant, radiographic, remote visual inspection (RVI), eddy-current testing, low-coherence interferometry, or similar. For example, in one embodiment, the non-destructive inspection tool 106 may include a detector head 108 that allows the tool 106 to locate the detectable datum marker 104 embedded within the component 102. Further, the detector head 108 may be optionally coupled to a controller 110 and/or a user interface 112 configured to generate an image of the component 102. Thus, the detector head 108 may be configured to take an image of the detectable datum marker(s) 104 from a distance or by placing the head 108 adjacent to the component 102. For example, as shown in FIG. 3(1), a first image generated by the non-destructive inspection tool 106 illustrates the locations of the four datum markers 104 (e.g. at an initial time), whereas FIG. 3(2) illustrates a second image by the non-destructive inspection tool 106 depicting the distorted locations of the four datum markers 104 (e.g. at some time later). As such, the controller 110 can automatically determine the difference between the measurement values of the first and second image to determine a total distortion of the component 102. Such a process can also be completed manually by a user.

Referring now to FIG. 4, a flow diagram of one embodiment of a method 200 for detecting distortion in a component of a gas turbine engine 10 is illustrated. As shown at 202, the method 200 includes forming a gas turbine engine component with at least one detectable datum marker configured at least partially therein. As shown at 204, the method includes installing the component 102 containing the detectable datum marker 104 within the gas turbine engine 10. As shown at 206, the method 200 includes monitoring, via a non-destructive inspection tool 106, a location of the detectable datum marker 104 within the component 102 over time. As shown at 208, if the location of one or more of the datum markers 104 changed during monitoring, then distortion 212 has occurred in the component 102. If the location of one or more of the datum markers 104 has not changed during monitoring, then no distortion 210 has occurred in the component 102.

In one embodiment, the step of forming the component 102 of the gas turbine engine 10 with at least one detectable datum marker 104 configured at least partially therein may include forming the component 102 via at least one of composite laminate layup, infusion, molding, casting, or other suitable process using a first material and placing the marker 104 during the manufacturing process.

In another embodiment, the method 200 may include the component 102 of the gas turbine engine 10 with a plurality of detectable datum markers 104 located in a plurality of predetermined locations.

In additional embodiments, the method 200 may include installing the aircraft engine on a wing of an aircraft and while the aircraft engine remains on-wing, monitoring, via the non-destructive inspection tool, the location of the detectable datum marker within the gas turbine engine component over time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for detecting distortion in a component of a gas turbine engine, the system comprising:
    at least one detectable datum marker configured between layers of the component; and
    a non-destructive inspection tool configured to monitor a location of the detectable datum marker over time,
    wherein distortion of the component is detected as a function of movement of the location of the detectable datum inside the layers of the component.

2. The system of claim 1, wherein the component comprises a process-formed component constructed at least in part of a first material.

3. The system of claim 2, wherein the process-formed component is formed via at least one of composite laminate layup, infusion, molding, or casting.

4. The system of claim 2, wherein the at least one detectable datum marker is constructed of a second material, wherein the first and second materials comprise varying densities.

5. The system of claim 4, wherein the second material comprises at least one of a metal, a metal alloy, a radio-frequency identification (RFID) chip, or a polymer plastic.

6. The system of claim 5, wherein the metal or metal alloy comprises at least one of tin, aluminum, nickel, lead, stainless steel, copper, or phosphor-bronze.

7. The system of claim 1, wherein the non-destructive inspection tool comprises at least one of the following inspection methods: ultrasonic, magnetic-particle, liquid penetrant, radiographic, remote visual inspection (RVI), eddy-current testing, or low-coherence interferometry.

8. The system of claim 1, wherein the at least one detectable datum marker comprises a plurality of detectable datum markers located at a plurality of predetermined locations.

9. The system of claim 1, wherein the gas turbine engine comprises an aircraft engine.

10. The system of claim 9, wherein the aircraft engine remains installed on an aircraft during inspection.

11. The system of claim 1, wherein the component of the gas turbine engine comprises at least one of a turbine blade, a turbine vane, a compressor blade, a compressor vane, a fan blade, a nozzle, a disc, or a shaft.

12. A method for detecting distortion in a component of a gas turbine engine, the method comprising:
   forming the component of the gas turbine engine with at least one detectable datum marker configured between layers of the component;
   installing the component containing the detectable datum marker within the gas turbine engine; and
   monitoring, via a non-destructive inspection tool, a location of the detectable datum marker within the gas turbine engine component over time,
   wherein distortion of the component is detected as a function of movement of the location of the detectable datum inside the layers of the component.

13. The method of claim 12, wherein forming the component with at least one detectable datum marker configured at least partially therein further comprises forming the component via at least one of composite laminate layup, infusion, molding, or casting using a first material.

14. The method of claim 13, wherein the at least one detectable datum marker is constructed of a second material, wherein the first and second materials comprise varying densities.

15. The method of claim 14, wherein the second material comprises at least one of a metal, a metal alloy, a radio-frequency identification (RFID) chip, or a polymer plastic.

16. The method of claim 15, wherein the metal or metal alloy comprises at least one of tin, aluminum, nickel, lead, stainless steel, copper, or phosphor-bronze.

17. The method of claim 12, wherein the non-destructive inspection tool comprises at least one of the following inspection methods: ultrasonic, magnetic-particle, liquid penetrant, radiographic, remote visual inspection (RVI), eddy-current testing, or low-coherence interferometry.

18. The method of claim 12, further comprising forming the component of the gas turbine engine with the at least one detectable datum marker comprising a plurality of detectable datum markers located at a plurality of predetermined locations.

19. The method of claim 11, wherein the gas turbine engine comprises an aircraft engine.

20. The method of claim 19, further comprising installing the aircraft engine on a wing of an aircraft and while the aircraft engine remains on-wing, monitoring, via the non-destructive inspection tool, the location of the at least one detectable datum marker between the layers of the component over time.

* * * * *